United States Patent [19]

Hirano

[11] Patent Number: 4,684,984
[45] Date of Patent: Aug. 4, 1987

[54] MOTION COMPENSATED INTERFRAME DECODING APPARATUS

[75] Inventor: Akira Hirano, Tokyo, Japan
[73] Assignee: NEC Corporation, Tokyo, Japan
[21] Appl. No.: 903,881
[22] Filed: Sep. 2, 1986

Related U.S. Application Data

[63] Continuation of Ser. No. 494,110, May 12, 1983, abandoned.

[30] Foreign Application Priority Data

May 14, 1982 [JP] Japan .................. 57-80922

[51] Int. Cl.$^4$ .................................. H04N 7/12
[52] U.S. Cl. .................. 358/136; 358/105; 358/167
[58] Field of Search ............ 358/133, 135, 136, 138, 358/167, 105

[56] References Cited

U.S. PATENT DOCUMENTS

| | | | |
|---|---|---|---|
| 4,058,836 | 11/1977 | Drewery et al. | 358/167 |
| 4,296,436 | 10/1981 | Achida | 358/105 |
| 4,307,420 | 12/1981 | Ninomiya et al. | 358/136 |
| 4,361,853 | 11/1982 | Remy et al. | 358/167 |
| 4,371,895 | 2/1983 | Koga | 358/136 |
| 4,500,911 | 2/1985 | Ninomiya et al. | 358/167 |

FOREIGN PATENT DOCUMENTS 1271161 6/1968 Fed. Rep. of Germany ...... 358/167

OTHER PUBLICATIONS

Rossi-"Digital Techniques"-SMPTE Journal, Mar. 1978, vol. 87, No. 3, pp. 134-140.

*Primary Examiner*—Joseph A. Orsino, Jr.
*Attorney, Agent, or Firm*—Blakely, Sokoloff, Taylor & Zafman

[57] ABSTRACT

A television signal which has a motion vector code signal and a prediction error code signal, is separated by a demultiplexer into a prediction error code signal and a motion vector code signal. These signals are decoded. A variable delay circuit receives an immediately preceding television signal from a frame memory and produces a prediction signal in response to the decoded motion vector signal. An adder receives the decoded prediction error signal and the prediction signal and produces a decoded television signal. A noise reducer reduces a small interframe variation component of the decoded television signal. This signal is converted by a D/A converter to an analog signal.

6 Claims, 8 Drawing Figures

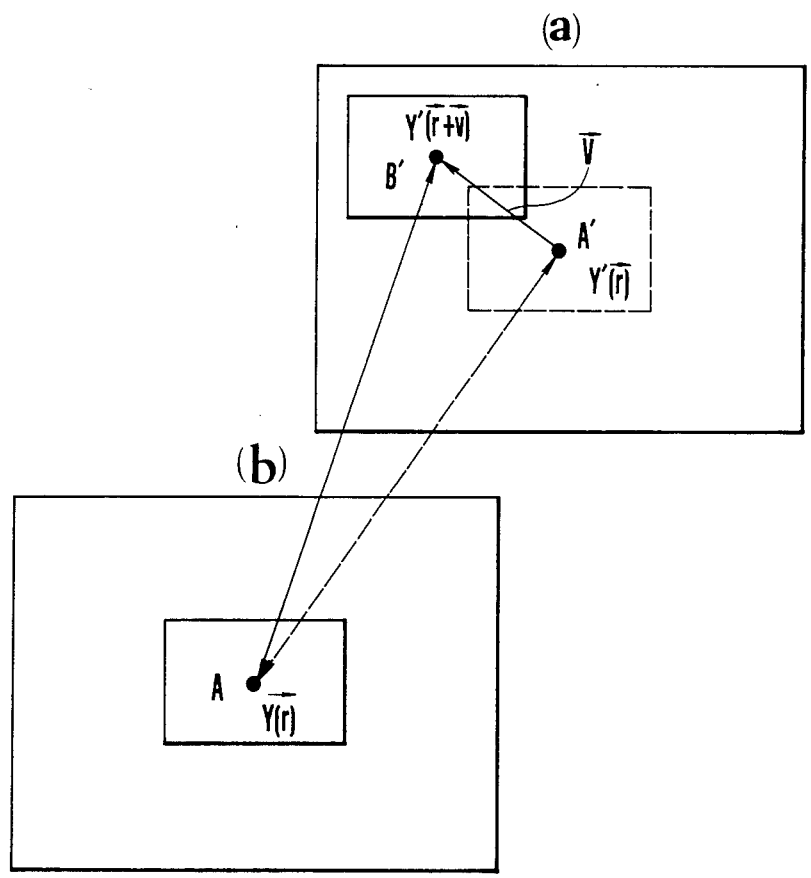
F I G. 1

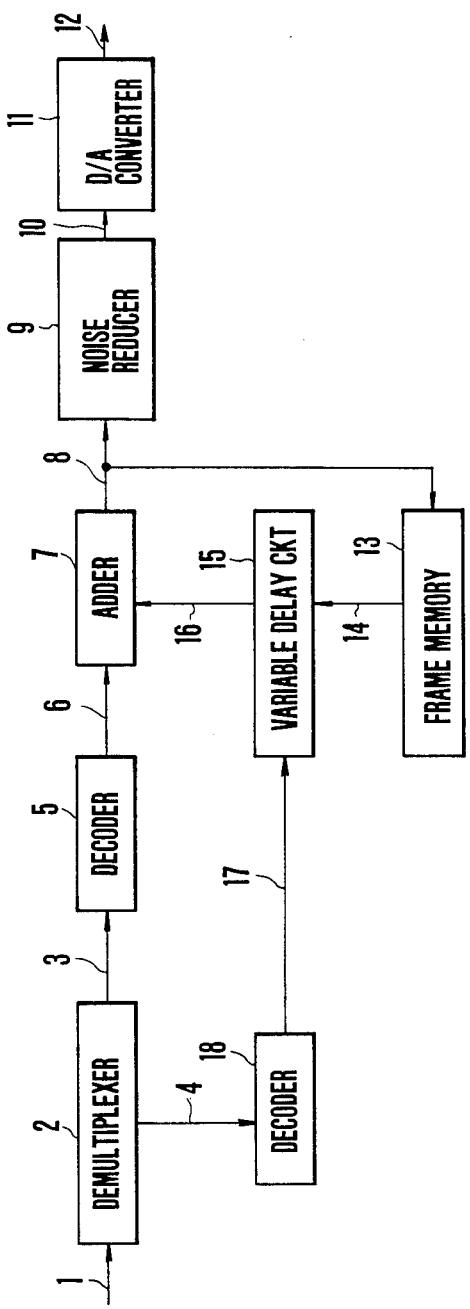
F I G. 4

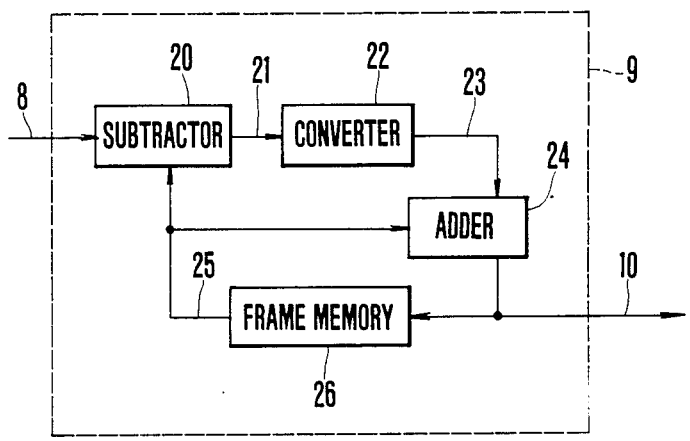
F I G. 5a
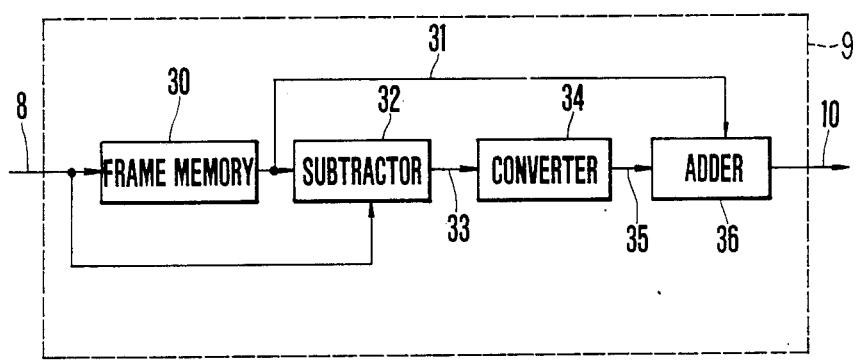
F I G. 5b

| INPUT ADDRESS SIGNAL | CORRESPONDING SIGNAL VALUE | OUTPUT | CORRESPONDING SIGNAL VALUE |
|---|---|---|---|
| 0 0 0 0 0 0 0 0 0 | 0 | 0 0 0 0 0 0 0 0 0 | 0 |
| 0 0 0 0 0 0 0 0 1 | 1 | 0 0 0 0 0 0 0 0 0 | 0 |
| 0 0 0 0 0 0 0 1 0 | 2 | 0 0 0 0 0 0 0 0 1 | 1 |
| 0 0 0 0 0 0 0 1 1 | 3 | 0 0 0 0 0 0 0 0 1 | 1 |
| 0 0 0 0 0 0 1 0 0 | 4 | 0 0 0 0 0 0 0 1 0 | 2 |
| 0 0 0 0 0 0 1 0 1 | 5 | 0 0 0 0 0 0 0 1 1 | 3 |
| 0 0 0 0 0 0 1 1 0 | 6 | 0 0 0 0 0 0 1 0 0 | 4 |
| 0 0 0 0 0 0 1 1 1 | 7 | 0 0 0 0 0 0 1 0 1 | 5 |
| 0 0 0 0 0 1 0 0 0 | 8 | 0 0 0 0 0 0 1 1 0 | 6 |
| 0 0 0 0 0 1 0 0 1 | 9 | 0 0 0 0 0 1 0 0 0 | 8 |
| 0 0 0 0 0 1 0 1 0 | 10 |  | 10 |
| ⋮ | ⋮ | SAME AS INPUT ADDRESS SIGNALS | ⋮ |
| 0 1 1 1 1 1 1 1 1 | 255 |  | 255 |
| 1 0 0 0 0 0 0 0 0 | -256 |  | -256 |
| ⋮ | ⋮ |  | ⋮ |
| 1 1 1 1 0 1 1 0 | -10 |  | -10 |
| 1 1 1 1 0 1 1 1 | -9 | 1 1 1 1 1 1 0 0 0 | -8 |
| 1 1 1 1 1 0 0 0 | -8 | 1 1 1 1 1 1 0 1 0 | -6 |
| 1 1 1 1 1 0 0 1 | -7 | 1 1 1 1 1 1 0 1 1 | -5 |
| 1 1 1 1 1 0 1 0 | -6 | 1 1 1 1 1 1 1 0 0 | -4 |
| 1 1 1 1 1 0 1 1 | -5 | 1 1 1 1 1 1 1 0 1 | -3 |
| 1 1 1 1 1 1 0 0 | -4 | 1 1 1 1 1 1 1 1 0 | -2 |
| 1 1 1 1 1 1 0 1 | -3 | 1 1 1 1 1 1 1 1 1 | -1 |
| 1 1 1 1 1 1 1 0 | -2 | 1 1 1 1 1 1 1 1 1 | -1 |
| 1 1 1 1 1 1 1 1 | -1 | 0 0 0 0 0 0 0 0 0 | 0 |

FIG.7

MOTION COMPENSATED INTERFRAME DECODING APPARATUS

This is a continuation of application Ser. No. 06/494,110 filed May 12, 1983, now abandoned.

BACKGROUND OF THE INVENTION

I. Field of the Invention

The present invention relates to a motion-compensated interframe decoding apparatus of a television signal.

II. Description of the Prior Art

Conventionally, in a digital data television signal transmission system, the number of bits of transmission data is greatly decreased when an interframe coding system is employed wherein an interframe difference signal of two adjacent frames (i.e., frame difference signal) is coded and transmitted, instead of employing a conventional pulse code modulation (PCM) system. In particular, a still picture image or an image with little motion can be transmitted at a high compression rate (corresponding to a rate at which the number of bits of data to be transmitted is decreased as compared with that of the PCM system). However, in the case of transmitting data of a moving picture image, a large frame difference signals are generated, thereby decreasing the compression rate. In order to eliminate this drawback, "motion-compensated interframe coding" is proposed. According to this system, a motion of the object in the television signal is detected, and a prediction signal is obtained from a motion-compensated television signal, thereby performing predictive coding.

However, the conventional motion-compensated interframe coding system has the following drawback. When the frequency of sampling of the prediction error signal is large (i.e., when coarse quantization characteristics are used), picture quality is degraded to cause a so-called "dirty window" wherein a quantized signal noise component appears at the still image. Furthermore, the dirty window degrades a visual effect, such that the noise component is observed in a mosaic manner while in motion. In particular, this occurs at a still image or still portion thereof which has a small change in brightness (to be referred to as a still image portion as a whole hereinafter), resulting in inconvenience.

SUMMARY OF THE INVENTION

It is an object of the present invention to provide a motion-compensated interframe decoding apparatus which greatly reduces degradation of image quality.

In order to achieve the above object of the present invention, there is provided a motion-compensated interframe decoding apparatus for decoding a television signal which includes a motion vector code signal and a prediction error code signal on the basis of a plurality of blocks obtained by dividing up one frame of a television picture, the motion vector code signal being defined as a displacement between corresponding picture elements of two adjacent frames in a given block, and the prediction error code signal being obtained by quantizing a signal indicating a difference between a motion-compensated prediction signal of an immediately preceding frame in a given block which is obtained by the motion vector code signal and a signal of a present frame in the given block, comprising: prediction signal generating means for separating the motion vector code signal from the prediction error code signal and for generating a prediction signal in response to a decoded motion vector signal; decoding means for decoding the television signal in accordance with a decoded prediction error signal and the prediction signal; noise reducing means for reducing at least a small interframe variation component of a decoded television signal from said decoding means; and a digital-to-analog converter, connected to said noise reducing means, for converting a digital signal from said noise reducing means to an analog signal.

BRIEF DESCRIPTION OF THE DRAWINGS

FIG. 1 shows in sections (a) and (b) the principle of motion-compensated interframe coding;

FIG. 4 is a block diagram of a motion-compensated interframe decoding apparatus according to an embodiment of the present invention;

FIGS. 5a and 5b are block diagrams of noise reducing circuits used for the motion-compensated interframe decoding apparatus, respectively;

FIG. 7 shows a data table of a read-only memory (ROM) used as the converter.

DETAILED DESCRIPTION OF THE PREFERRED EMBODIMENT

Figure 2:
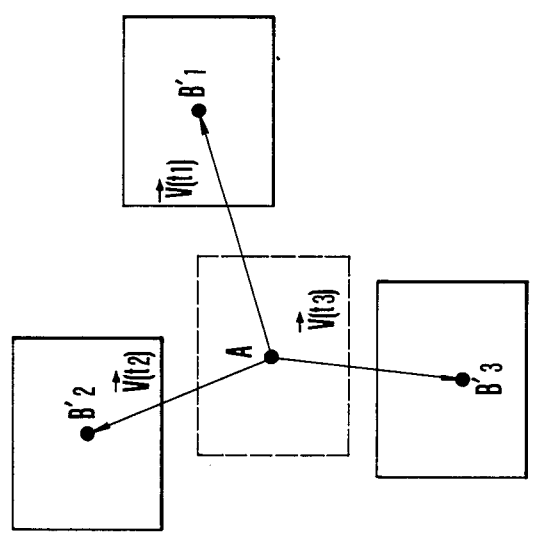
FIG. 2 is a diagrammatic representation for explaining image quality degradation inherent to motion-compensated interframe coding.

In order to best understand the present invention, the principle of motion-compensated interframe coding will first be described.

FIG. 1 shows in sections (a) and (b), the state wherein an object positioned at point B' in the preceding frame (section (a)) is moved to point A in the present frame (section (b)). According to motion-compensated interframe coding, a displacement $\vec{v}$ (to be referred to as a motion vector $\vec{v}$ hereinafter) from point B' in the preceding frame to point A' in the preceding frame (corresponding to point A in the present frame) is calculated. A signal $Y'(\vec{r}+\vec{v})$ at point B' instead of a signal $Y'(\vec{r})$ at point A' is used as a motion-compensated prediction signal and is subtracted from a signal $Y(\vec{r})$ at point A so as to obtain a prediction error signal $Y(\vec{r})-Y'(\vec{r}+v)$ where r is the position vector which indicates a given position on the television screen. It should be noted that the signal $Y'(\vec{r})$ is generally used as a prediction signal for simple interframe coding wherein the signal $Y'(\vec{r})$ is subtracted from the signal $Y(\vec{r})$ to obtain a prediction error signal $Y(\vec{r})-Y'(\vec{r})$.

The prediction error signal $Y(\vec{r})-Y'(\vec{r}+\vec{v})$ in motion-compensated interframe coding is much smaller than the prediction error signal $Y(\vec{r})-Y'(\vec{r})$. Therefore, the former prediction error signal can be effectively used to code an image signal with a moving object.

For example, a motion-compensated interframe coding system is disclosed in U.S. Pat. No. 4,307,420 by Ninomiya et al. filed on June 2, 1980. According to this system, each frame of signal components of a television or motion picture signal is divided into a plurality of blocks. Calculated values which indicate similarity measures between picture elements in blocks of the preceding frame (corresponding to the picture elements in the preceding frame, but moved by various displacements) and picture elements in blocks of the present frame are obtained on the basis of the same reference point for the television signal components of the blocks of present frame. The various displacements are referred to as shift vectors hereinafter. The shift vector corresponding to the highest similarity measure of the block is detected as a motion vector. In the above similarity calculation, the similarity measure may be defined either as an absolute value of a signal indicating a difference between the signals (corresponding to the above-mentioned picture elements) of the preceding and present frames, or as the number of signals whose absolute values exceed a predetermined threshold level.

As previously described, the conventional motion-compensated interframe coding results in the dirty window effect wherein the noise component is observed in a mosaic manner while in motion. This drawback is caused for the following reason. The signal of the preceding frame which has the highest similarity measure of the block (the position of the block is indicated by the motion vector) is used as a prediction signal with respect to the corresponding signal of the present frame. Therefore, when the coarse quantization characteristics are used, the preceding frame signal is degraded by the quantization noise component. The prediction signal is produced based on the motion vector which indicates the block position of the degraded preceding frame signal, and an image corresponding to the dirty window visually observed remaining at the still image portion in simple interframe coding is observed in a mosaic manner while in motion. In particular, in the still image portion, the preceding frame signal is degraded by the quantization noise component. As a result, the similarity measure corresponding to the shift vector indicating the block for the still image is not always detected to be maximum. The picture elements in this block are regarded as being in motion. Thus, the mosaic pattern is visually observed in motion. The above drawback will be described in detail with reference to FIG. 2.

Referring to FIG. 2, point A indicates a given picture element on the television screen. Motion vectors $\vec{v}(t1)$, $\vec{v}(t2)$ and $\vec{v}(t3)$ are respectively obtained at times t1, t2 and t3 in the block which includes point A. Times t1, t2 and t3 indicate the consecutive frame times: for example, time t1 is the time of the immediately preceding frame; time t2 is the time of the present frame; and time t3 is the immediately following frame time. Time t0 is the preceding frame time immediately before time t1.

For example, a signal at picture element position B'1 at time t0 is selected as a prediction signal for the signal at picture element position A at time t1. Similarly, a signal at picture element position B'2 at time t1 is selected as a prediction signal for a signal at the picture element position A at time t2, and a signal at picture element position B'3 at time t2 is selected as a prediction signal for a signal at the picture element position A at time t3. When the predictive coded image obtained by using the prediction signals (generated by the previous frame signals degraded by the quantization noise components as previously described) is observed on the television screen, the influence of the quantization noise component present in the picture element position B'1 at time t0 appears in the picture element position A at time t1. Similarly, the influence of the quantization noise component present in the picture element position B'2 at time t1 appears in the picture element position A at time t2. The influence of the quantization noise component present in the picture element position B'3 at time t2 appears in the picture element position A at time t3.

The above influence of the noise component appears in all the picture elements in the given block. Therefore, the quantization noise component included in the preceding frame signal appears in units of blocks. On the other hand, in a block adjacent to the given block, the motion vectors tend to be different (especially at the still picture portion), and the adjacent block is differently influenced by the quantization noise component. Furthermore, the influence of the quantization noise component is different upon a single block in accordance with different frame times. In this manner, the influence of the quantization noise component changes in accordance with space and time factors.

The quantization noise component is observed in the mosaic manner while in motion, thereby resulting in decisive degradation of picture quality.

In the motion-compensated interframe coding system in accordance with the mechanism described above, the quantization noise component from a quantizer which receives a prediction error signal adversely affects the image, which is visually observed in a mosaic manner while in motion.

Figure 3:
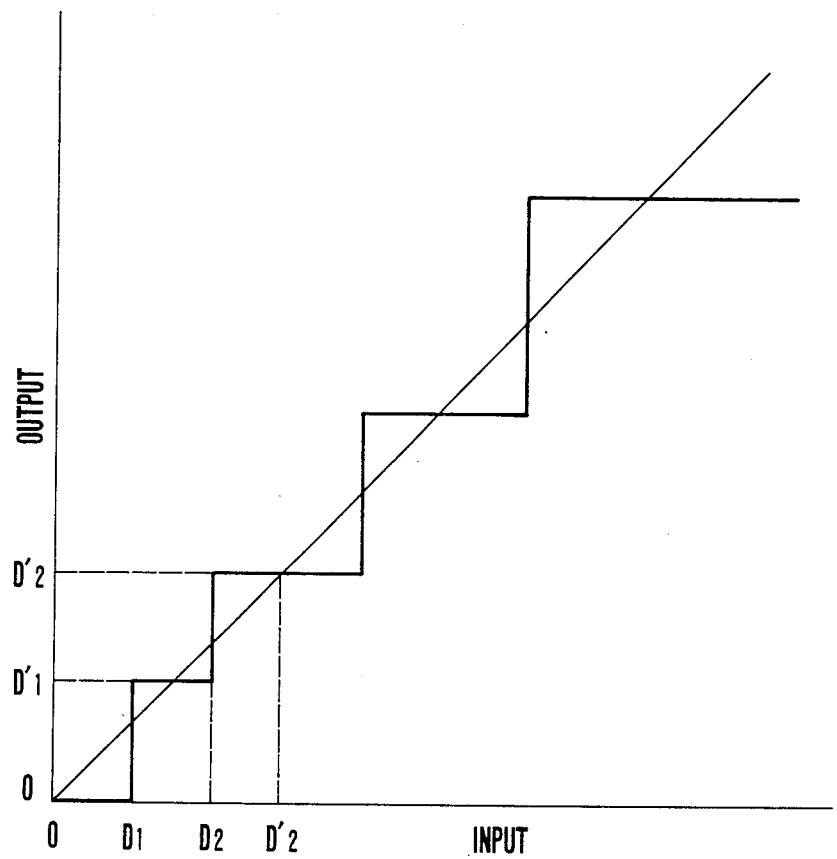
FIG. 3 is a graph for explaining quantization characteristics (output signal) as a function of the prediction error signal (input signal)

FIG. 3 is a graph for explaining the quantization characteristics (output signal) as a function of the prediction error signal (input signal). If these quantization characteristics are utilized, a small noise component which is included in a quantized signal level mostly influences the degradation of the image quality described above. The prediction error signal components supplied to the quantizer are mostly set at level "0". The distribution of this small noise component changes with respect to time and space, thereby degrading the picture quality.

If the above-mentioned small change in the television signal over time (between frames) is suppressed, the degradation of picture quality can be greatly reduced.

A motion-compensated interframe decoding apparatus according to an embodiment of the present invention will now be described with reference to the accompanying drawings.

FIG. 4 is a block diagram of the motion-compensated interframe decoding apparatus according to the present invention. Referring to FIG. 4, a composite signal which includes a motion vector signal and a prediction error signal is supplied to a signal line 1. The composite signal is supplied to a demultiplexer 2 which separates the motion vector signal from the prediction error signal. The prediction error signal is then supplied to a first decoder 5 through a signal line 3. On the other hand, the motion vector signal is supplied to a second decoder 18 through a signal line 4. The second decoder 18 decodes the motion vector signal. A decoded or expanded signal is then supplied to a variable delay circuit 15 through a signal line 17.

The first decoder 5 decodes the prediction error signal. A decoded or expanded signal is then supplied to an adder 7 through a signal line 6. The expanded signal supplied through the signal line 6 is added by the adder 7 to a prediction signal supplied through a signal line 16, thus obtaining a television signal which is then supplied onto a signal line 8. The television signal is supplied to a frame memory 13 and to a noise reducer 9 in order to decode the subsequent television signal.

The noise reducer 9 reduces the noise component of the interframe television signal. The noise-reduced television signal is then supplied to a digital-to-analog converter (to be referred to as a D/A converter) 11 through a signal line 10. The D/A convert 11 converts the input digital television signal to an analog television signal which is then supplied onto a signal line 12.

Meanwhile, the television signal supplied to the frame memory 13 is delayed by about one frame. The about one-frame delayed signal is then read out and supplied to the variable delay circuit 15 through a signal line 14. The variable delay circuit 15 delays the input signal from the signal line 14 in accordance with the motion vector signal supplied through the signal line 17. The variable delay circuit 15 then supplies a delayed signal onto a signal line 16. The variable delay circuit 15 comprises a random access memory which has a matrix or two-dimensional memory area. The preceding frame television signals corresponding to the motion vector signals are sequentially read out from the variable delay circuit 15 one at a time.

FIGS. 5a and 5b are block diagrams of noise reducers, either one of which may be used in the motion-compensated interframe decoding apparatus according to the present invention. The mode of operation of each noise reducer 9 will be described hereinafter. Each noise reducer 9 serves to reduce the interframe noise component. In order to achieve this, various arrangements can be proposed. However, only the arrangements shown in FIGS. 5a and 5b will be described.

Referring to FIG. 5a an embodiment of noise reducer is illustrated. In the reducer 9, the television signal is supplied to a subtractor 20 through the signal line 8. The subtractor 20 subtracts this television signal from the about one-frame previous television signal supplied from a frame memory 26 through a signal line 25. In other words, a difference signal between the two adjacent frames is obtained. The difference signal is then supplied to a converter 22 through a signal line 21. A converter 22 has an input-output characteristic curve (indicated by the solid line in FIG. 6) wherein a gain for the difference signal is less than 1. The difference signal of the immediately preceding frame is reduced by the converter 22. The noise-reduced signal is then supplied to an adder 24 through a signal line 23. The signal supplied through the signal line 23 is added by the adder 24 to the about one-frame previous television signal supplied from the frame memory 26 through the signal line 25. The sum signal is then supplied onto the signal line 10. In this manner, the television signal is obtained wherein the small noise component of the immediately preceding frame is reduced. Subsequently, the signal appearing on the signal line 10 is supplied to the frame memory 26. This signal is used to perform the same operation as described above with respect to the subsequent television signal of the subsequent frame which is supplied to the signal line 8.

Referring to FIG. 5b, there is illustrated another embodiment of noise reducer. In the reducer 9, the television signal is supplied from the signal line 8 to a frame memory 30 and a subtractor 32. The frame memory 30 delays the television signal by about one frame. The delayed television signal is supplied to the subtractor 32, and to an adder 36 through a signal line 31. The about one-frame preceding television signal supplied through the signal line 31 is subtracted by the subtractor 32 from the television signal supplied through the signal line 8, thereby obtaining an interframe difference signal The subtraction result is supplied from the subtractor 32 to a converter 34 through a signal line 33. The input-output characteristic curve of the converter 34 is the same as that of the converter 22. An output signal from the converter 34 is supplied to the adder 36 through the line 35 and is added by the adder 36 to the about one-frame preceding television signal supplied through the signal line 31. The sum signal then appears at the signal line 10. As a result, the television signal is obtained wherein the small noise component of the about one-frame preceding signal is reduced.

Figure 6:
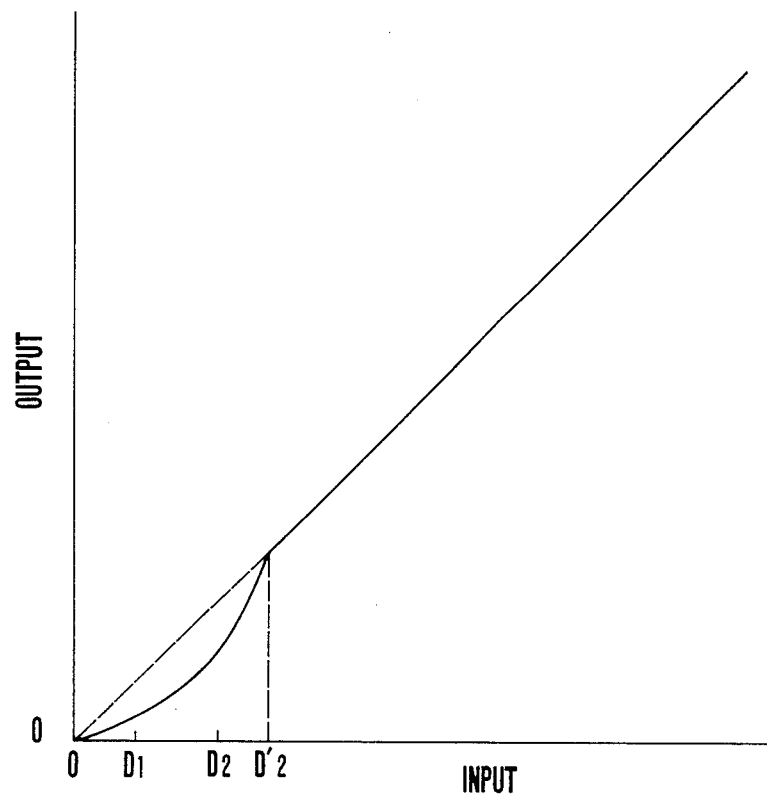
FIG. 6, is a graph for explaining the input characteristics of a converter as a function of the output characteristics thereof.

In the above embodiment, the converters 22 and 34 of the noise reducers 9 in FIGS. 5a and 5b, respectively, have the same input-output characteristic curve shown in FIG. 6. However, the converters may have a different input-output characteristic curve, provided that the gain of the small noise component is less than 1.

The input-output characteristic curve of the converter 22 is substantially solely determined by the quantization characteristics (FIG. 3) used in the coding apparatus. Referring again to FIG. 3, D1 and D2 designate lower first and second threshold levels; and D'2 designates a lower second quantized output level. As previously mentioned, the prediction error signal components supplied to the quantizer are mostly localized at level "0", so that the quantization noise component is mixed in the small quantized output signal level range between 0 and D'2. As a result, in general, 95% of the quantization noise component appears at the output end. Therefore, when the difference signal component having the output level D'2 among the signal components supplied to the converter 22 is reduced, the blurred image provided by the quantization noise component is greatly improved. The converter 22 comprises, for example, a read-only memory (ROM). Output data of the ROM is prestored at an address corresponding to the difference signal. In this case, if a picture signal comprises 8-bit data, the signal supplied to the converter must comprise 9-bit data which includes a sign bit. Therefore, the converter 22 comprises a ROM which writes/reads 9-bit data which includes a sign bit. Therefore, the coverter 22 comprises a ROM which writes/reads 9-bit input/output data. If D'2 is given as 10, the data table of the ROM is shown in FIG. 7.

Referring again to FIG. 5b, the noise reducer 9 can be modified as follows.

The converter 34 has the input-output characteristic curve shown in FIG. 6, with reference to FIG. 5b. Even if the input-output characteristics of the converter are obtained by multiplying the input value by a predetermined value G (G<1), the picture quality can be improved in the same manner as in the above embodiment. In this case, a transfer function H(z) between the signal line 8 and the signal line 10 is given as follows:

$$H(z) = G + (1-G) \cdot Z^{-F}$$

where $Z^{-F}$ is the frame delay.

In the above embodiment, the noise reducer 9 serves to "reduce a small change in interframe signal components". However, as may be apparent from the above description, even if the noise reducer 9 has a weighted mean characteristic or the like of the consecutive frame signals, the same effect as obtained in the above embodiment can be obtained.

In summary, the picture quality degradation or deterioration occurring in motion-compensated interframe decoding can be greatly decreased, thereby providing a variety of practical applications.

What is claimed is:

1. A motion-compensated interframe decoding apparatus for decoding a coded television signal and reducing mosaic noise which includes a motion vector code signal and a prediction error code signal on the basis of a plurality of blocks obtained by dividing up one frame of a television picture, the motion vector code signal being defined as a displacement between corresponding picture elements of two adjacent frames in a given block, and the prediction error code signal being obtained by quantizing a signal indicating a difference between a motion-compensated prediction signal of an immediately preceding frame in a given block which is obtained by the motion vector code signal and a signal of a present frame in the given block, comprising:
 a demultiplexer for receiving the television signal which has the motion vector code signal and the prediction error code signal;
 a first decoder connected to said demultiplexer so as to receive the prediction error code signal;
 a second decoder connected to said demultiplexer so as to receive the motion vector code signal;
 a variable delay circuit means connected to said second decoder so as to receive a decoded motion vector signal and to produce a prediction signal in response to the decoded motion vector signal;
 adder means connected to said first decoder and said variable delay circuit so as to produce a television signal corresponding to the received decoded prediction error signal, and prediction signal;
 frame memory means connected to receive the television signal from said adding means, and connected to supply the television signal, delayed by about one frame to said variable delay circuit, to facilitate the variable delay circuit in producing the prediction signal in response to the decoded motion vector signal;
 noise reducing means for reducing at least a small interframe variation component of the television signal from said adding means thereby reducing mosaic noise; and
 a digital-to-analog converter, connected to said noise reducing means, for converting a digital signal from said noise reducing means to an analog signal wherein said analog signal is substantially free from mosaic noise.

2. An apparatus according to claim 1, wherein said variable delay circuit includes a random access memory for storing the immediately preceding television signal from said frame memory in a matrix form so as to sequentially produce each immediately preceding television signal corresponding to one picture element in response to the decoded motion vector signal from said second decoder.

3. An apparatus according to claim 1, wherein said noise reducing means comprises:
 a subtractor connected to said adding means so as to receive the television signal;
 a frame memory connected to said subtractor so as to supply an immediately preceding television signal to said subtractor;
 a converter connected to said subtractor so as to receive a difference signal which indicates a difference between the decoded television signal and the immediately preceding television signal; and
 an adder connected to said converter and said frame memory so as to add an output signal from said converter and the immediately previous television signal from said frame memory and to supply a sum signal therefrom to said frame memory and to said digital-to-analog converter.

4. An apparatus according to claim 1, wherein said noise reducing means comprises:
 a frame memory connected to said adding means so as to receive the television signal;
 a subtractor connected to said frame memory and said adding means so as to receive an about one-frame delayed television signal and the decoded television signal;
 a converter connected to said subtractor so as to receive a difference signal; and
 an adder connected to said converter and said frame memory so as to receive an output signal from said converter and the about one-frame delayed television signal from said frame memory, and to produce a sum signal to said digital-to-analog converter.

5. An apparatus according to claim 3 or 4, wherein said converter comprises a read-only memory which suppresses said difference signal.

6. An apparatus according to claims 3 or 4, wherein said converter comprises a read-only memory which reads out an output signal corresponding to a value of the difference signal multiplied by a predetermined value G, where G is not more than 1.

* * * * *